United States Patent Office 3,136,647
Patented June 9, 1964

3,136,647
BASIC ZINC SULFATE PIGMENTS
George R. Waitkins and John B. Crawford, Des Peres, Mo., assignors to American Zinc, Lead & Smelting Co., St. Louis, Mo., a corporation of Maine
No Drawing. Filed Feb. 15, 1960, Ser. No. 8,512
1 Claim. (Cl. 106—292)

This invention relates to pigments and has particular application to zinc pigments useful in the compounding of elastomeric compositions and in conjunction with other organic vehicles.

Zinc pigments have been known and used for a long time. It is common practice, for example, to use zinc oxide in the compounding of rubber. Zinc pigments are also well known as paint pigments in conjunction with organic paint vehicles. Basic zinc salts, i.e., salts of the general empirical formula $xZn(OH)_2 \cdot ZnA$, where A is an anion, are well known heretofore. However, the basic zinc salts, in the forms contemplated heretofore, have been considered to be undesirable as pigments. For example, Seguine, Patent No. 1,863,700, says of basic zinc chloride that it "is not strictly suitable for pigment purposes." Barfuss, No. 1,982,604, discloses a method of forming zinc oxide, by which the formation of "acid residues" is minimized, his resulting product containing 0.1% of chlorine. Smith, No. 2,310,128, discloses a method of forming a "hardened metal oxychloride coating" in situ on a surface, but Smith makes clear that a basic metal salt is of no value as a pigment.

Rankin, No. 2,769,716, disclosed the incorporation of a very small amount of a halide, into zinc oxide pigment, to inhibit the development and growth of fungus, mold, mildew, smuts or the like. The zinc pigments of Rankin contain about 0.2 to 0.3% chlorine and are primarily intended as fungicides. The chlorine was thought to be necessary as a fungicide but was undesirable as a film forming ingredient. Accordingly, an amount was used that would give some fungicidal values but not enough to unduly damage the paint film. Rankin's formula with 0.3% chlorine would correspond to about $(ZnO)_{300}ZnCl_2$.

Allison, No. 1,444,051, discloses the use of a pasty mixture of a basic zinc chloride and ammonium chloride, in water, as a fireproofing material in paint. Allison depends upon zinc oxide or the like to serve as pigment, saying of the basic zinc chloride that it "affords practically no pigmenting effect."

One of the objects of this invention is to provide colorless basic zinc compounds in such a form as to be highly useful as pigments in compounding elastomers, plastics and paints.

Another object of this invention is to provide a method of producing colorless basic zinc compositions in the form of pigments of particular utility.

Still another object of this invention is to provide pigments of a pH within the approximate range of about 6 to 8, which will, at the same time, provide a reservoir of acid, so as to act as a buffer.

Other objects will become apparent to those skilled in the art in the light of the following description.

In accordance with this invention, generally stated, a colorless zinc composition is provided as a pigment capable of acting as a substantial reservoir of acidic material, the pigment having a pH of not less than about 6, a low density and opacity as compared with zinc oxide, and having a general empirical formula of $nZn(OH)_2 \cdot ZnA$, wherein $n$ is a number between one and thirteen, and A is an anion of a strong acid.

A strong acid, within the purview of the present invention, is one whose acidity is not substantially below the acidity of acetic acid, and further one which would for a colorless basic zinc salt, according to the process of the present invention.

Methods of producing this pigment are provided by which the pigment can be made in the form of acicular particles, "round" particles, or thin hexagonal plates, for specific uses.

The pigments of this invention may be prepared with surface active agents, in such a way as to make them readily incorporable in organic media in which untreated pigments are difficultly incorporable, such as cationic, anionic and non-ionic surfactants.

The pigments of this invention tend to hold the pH of paints and elastomers in which they are incorporated at a constant value within the range of approximately 6 to 8.

As has been indicated, the various forms of the pigment of this invention have particular utility in various different applications. For example, acicular basic zinc compounds, of the character hereafter described, formed in the presence of a coating of cationic surface active agent, has been found particularly effective as a mildew resistant paint pigment with excellent resistance to chalking and great stability on protracted standing. For incorporation into organic materials, rounds, aciculars and flat plate particles give excellent results.

Examples of the pigment of this invention, methods of its manufacture, and suitable applications for the pigment are set forth hereafter.

EXAMPLE I

Seven pounds five ounces of $ZnSO_4 \cdot H_2O$ were dissolved in five gallons of water, and twenty cubic centimeters of concentrated sulfuric acid were added to clear the solution. One pound eleven ounces of sodium hydroxide (tech. 96%) were also dissolved in five gallons of water. These two solutions were added together through the eye of a turbine mixer and a heavy, viscous slurry with a pH of 5–6 resulting. The slurry was filtered, and the cake was washed well and dried at 110° C. The product was milled with 0.6% zinc propionate, and a white, soft pigment was obtained. By analysis, the product showed a basicity of $2.9Zn(OH)_2 \cdot ZnSO_4$.

EXAMPLE II

Six pounds three ounces of $ZnCl_2$ (tech. 94%) were dissolved in five gallons of water, and 20 cc. of hydrochloric acid were added to clear the solution. One pound five ounces of sodium hydroxide (tech. 96%) were dissolved in five gallons of water. The two solutions were added together through the eye of a turbine mixer, as in Example I, and the product was filtered, washed, and dried at 110° C. The resulting product was softer than the product of Example I and disintegrated easily. The product was milled with 0.6% zinc propionate. The analysis showed the basicity to be $4Zn(OH)_2 \cdot ZnCl_2$.

Through microscopic observation, it was determined that the particles of both Examples I and II were "rounds" of about the same size as so-called "rubber grade" zinc oxide. The standard of comparison was "Azo 55" zinc oxide, sold by the American Zinc Sales Co.

The density of the pigment of Example I was calculated to be 3.6, and the density of the pigment of Example II to be 3.8. This is to be compared with the density of zinc oxide, which is approximately 5.6.

The pigments of Examples I and II, which were milled with a wetting agent, dispersed more readily and thoroughly than did similar pigments not milled with a wetting agent.

EXAMPLE III

Pigment of Example I, but without the wetting agent, was calcined at 250° C., and most of the combined water was driven off, so that the product had the approximate formula $3ZnO \cdot ZnSO_4$. A comparison of the analyses of the pigments of Examples I and III is as follows:

| Example | Temp. of Drying, °C. | Percent Zn | Percent SO₄ | Calculated | | | Total |
|---|---|---|---|---|---|---|---|
| | | | | Percent Zn(OH)₂ | Percent ZnO | Percent ZnSO₄ | |
| I | 110 | 56.5 | 20.4 | 65.0 | -------- | 34.3 | 99.3 |
| III | 250 | 62.2 | 22.4 | -------- | 58.3 | 37.7 | 96.0 |

EXAMPLE IV

The pigment of Example II, without the wetting agent, was calcined at 250° C., and most of the combined water was driven off, so that the product had the approximate formula $4ZnO \cdot ZnCl_2$. The pigment was then milled with zinc propionate, as in Example II. A comparison of the analyses of the pigment of Examples II and IV, is as follows:

| Example | Temp. of Drying, °C. | Percent Zn | Percent Cl | Percent Zn(OH)₂ | Percent ZnO | Percent ZnCl₂ | Total |
|---|---|---|---|---|---|---|---|
| II | 110 | 62.1 | 13.0 | 76.1 | -------- | 25.0 | 101.1 |
| IV | 250 | 67.3 | 13.7 | -------- | 68.2 | 26.3 | 94.5 |

Separate samples of rubber were made up, using zinc oxide, the pigment of Example I and the pigment of Example II, respectively, all in an amount of five parts by weight, and samples of the same rubber were also made up with fifty parts, by weight, of the pigment of Example I and the pigment of Example II. The formula of the compounded rubber was as follows:

| | Parts by weight |
|---|---|
| Smoked sheet (rubber) | 100 |
| Mercaptobenzothiazole | 0.75 |
| Sulfur | 3 |
| Stearic acid | 1 |
| Pigment | 5 (and 50 as noted) |

The following data show that the physical properties of the vulcanized rubber containing the pigments of Examples I and II were superior to rubber containing the standard high grade zinc oxide. The rate of cure of the rubber containing the basic zinc sulfate (Example I) was about the same as that of the rubber containing the zinc oxide. The rubber containing the basic zinc chloride (Example II) showed a very satisfactory retardation of cure. The buffering effect of the pigments of both examples is strong. The curing rate for the rubber containing five parts and that containing fifty parts of the pigment is substantially the same, with both the pigment of Example I and the pigment of Example II. Thus the rate of cure appears to be determined by the kind of pigment, rather than its amount. Likewise, rubber made up with the pigments of Examples III and IV, but otherwise of the same composition as the rubber made up with the pigments of Examples I and II, exhibited the following characteristics:

*Table I*

STRESS-STRAIN EVALUATIONS

| | A | B | A | B | C | D | C | D |
|---|---|---|---|---|---|---|---|---|
| Zinc Pigment | ZnO | BZSO₄¹ | BZCl¹ | BZSO₄¹ | BZCl¹ | KBZSO₄² | KBZCl² | KBZSO₄² | KBZCl² |
| Percent zinc pigment on rubber | 5 | 5 | 5 | 50 | 50 | 5 | 5 | 50 | 50 |
| Min. cured at 287° F.: | | | | | | | | | |
| 15 load at 300% Elong.; p.s.i | 90 | 100 | 10 | 200 | 70 | | | | |
| 15 load at 500% Elong.; p.s.i | 240 | 235 | 35 | 700 | 210 | | | | |
| 15 load at 700% Elong.; p.s.i | 850 | 890 | 95 | 2,100 | 645 | | | | |
| 15 load at 900% Elong.; p.s.i | | | 325 | | | | | | |
| 15 load at break | 1,850 | 2,250 | 680 | 2,620 | 855 | | | | |
| Elong. at break | 820 | 890 | 1,080 | 770 | 740 | | | | |
| 10 Sec. Shore A hard | 27 | 27 | 17 | 32 | 21 | | | | |
| 24 Hr. bloom | no | no | yes porous | no | yes porous | | | | |
| 20 load at 300 | 115 | 115 | 40 | 235 | 105 | 130 | | 245 | |
| 20 load at 500 | 270 | 260 | 70 | 780 | 320 | 290 | | 690 | |
| 20 load at 700 | 950 | 920 | 220 | 2,360 | 1,030 | 915 | | | |
| 20 load at 900 | | | 635 | | | | | | |
| 20 load at break | 2,410 | 2,480 | 1,400 | 2,770 | 1,540 | 2,175 | | 1,590 | |
| Elong. at break | 860 | 875 | 1,035 | 730 | 785 | 870 | | 690 | |
| Hard | 29 | 28 | 20 | 35 | 28 | 27 | | 30 | |
| Bloom | no | no | yes | no | yes | slight | | slight | |
| 30 load at 300 | 130 | 130 | 60 | 250 | 145 | 130 | | 285 | |
| 30 load at 500 | 340 | 340 | 135 | 790 | 475 | 370 | | 875 | |
| 30 load at 700 | 1,175 | 1,255 | 500 | 2,500 | 1,570 | 1,150 | | | |
| 30 load at 900 | | | 1,615 | | | | | | |
| 30 load at break | 2,550 | 2,700 | 1,930 | 2,860 | 2,060 | 2,240 | | 1,700 | |
| Elong. at break | 835 | 835 | 935 | 715 | 770 | 830 | | 640 | |
| Hard | 30+ | 31 | 23 | 37 | 30 | 30 | | 31+ | |
| Bloom | no | no | yes | no | yes | no | | no | |
| 45 load at 300 | 140 | 145 | 90 | 290 | 195 | 130 | 20 | 355 | 85 |
| 45 load at 500 | 345 | 350 | 160 | 845 | 640 | 400 | 55 | 940 | 245 |
| 45 load at 700 | 1,070 | 1,310 | 735 | 2,660 | 2,060 | 1,300 | 155 | | 620 |
| 45 load at 900 | | | | | | | 580 | | |
| 45 load at break | 2,560 | 2,650 | 2,280 | 2,660 | 2,460 | 2,480 | 985 | 1,900 | 940 |
| Elong. at break | 835 | 800 | 890 | 700 | 730 | 815 | 1,015 | 655 | 790 |
| Hard | 31 | 31 | 25 | 39 | 32 | 31+ | 20 | 33 | 24 |
| Bloom | no | no | yes | no | some | no | heavy | no | heavy |
| 60 load at 300 | | | 140 | 100 | 310 | 240 | 135 | 15 | 360 | 125 |
| 60 load at 500 | | | 355 | 230 | 845 | 740 | 420 | 155 | 960 | 380 |
| 60 load at 700 | | | 1,235 | 930 | | 2,300 | 1,380 | 325 | | |
| 60 load at 900 | | | | | | | | 1,115 | | |
| 60 load at break | | | 2,810 | 2,460 | 2,640 | 2,550 | 2,620 | 1,470 | 2,090 | 1,220 |
| Elong. at break | | | 820 | 855 | 695 | 715 | 805 | 980 | 670 | 770 |
| Hard | | | 30 | 28 | 40 | 34 | 31+ | 21+ | 34+ | 25 |
| Bloom | | | no | some | no | no | no | yes | no | yes |
| 75 load at 300 | | | | | | | 150 | 45 | 375 | 130 |
| 75 load at 500 | | | | | | | 380 | 160 | 980 | 330 |
| 75 load at 700 | | | | | | | 1,350 | 400 | | 1,145 |
| 75 load at 900 | | | | | | | | 1,380 | | |
| 75 load at break | | | | | | | 2,430 | 1,750 | 1,960 | 1,540 |
| Elong. at break | | | | | | | 805 | 960 | 670 | 765 |
| Hard | | | | | | | 32 | 23 | 35 | 26+ |
| Bloom | | | | | | | no | yes | no | yes |
| 90 load at 300 | | | | | | | 150 | 70 | 350 | 135 |
| 90 load at 500 | | | | | | | 400 | 160 | 980 | 525 |
| 90 load at 700 | | | | | | | 1,310 | 500 | | 1,500 |
| 90 load at 900 | | | | | | | | 1,810 | | |
| 90 load at break | | | | | | | 2,840 | 1,840 | 2,050 | 1,540 |
| Elong. at break | | | | | | | 810 | 910 | 660 | 710 |
| Hard | | | | | | | 31+ | 25 | 35 | 29 |

See footnotes at end of table.

*Table I.*—Continued

STRESS-STRAIN EVALUATIONS

|  | A | B | A | B | C | D | C | D |
|---|---|---|---|---|---|---|---|---|
| Bloom | | | | | no | yes | no | yes |
| 120 load at 300 | | | | | | 95 | | 195 |
| 120 load at 500 | | | | | | 220 | | 660 |
| 120 load at 700 | | | | | | 800 | | 1,950 |
| 120 load at break | | | | | | 2,120 | | 2,110 |
| Elong. at break | | | | | | 885 | | 720 |
| Hard | | | | | | 26+ | | 30+ |
| Bloom | | | | | | yes | | yes |
| 150 load at 300 | | | | | | 115 | | 260K |
| 150 load at 500 | | | | | | 240 | | 800 |
| 150 load at 700 | | | | | | 990 | | |
| 150 load at break | | | | | | 2,180 | | 2,010 |
| Elong. at break | | | | | | 845 | | 695 |
| Hard | | | | | | 27+ | | 31+ |
| Bloom | | | | | | slight | | slight |
| Lab Temperature, °F | 70–75 | 72 | 72 | 72 | 72 | 70 | 70 | 70 |
| Optimum cure, min | 45 | 60 | 60 | 30 | 60 | 60 | 75 | 150+ |
| Specific gravity: | | | | | | 150 | | |
| Rubber compound | | 1.215 | 1.225 | | | 1.255 | 1.252 | |
| Pigment | | 3.56 | 3.83 | | | 4.27 | 4.17 | |

Dispersion: Those pigments dried at 110° C. dispersed thoroughly and efficiently, while those calcined at 250° C. dispersed very poorly. The sulfates dispersed more readily than did the chlorides, but the degree of dispersion between them was just minor.

[1] BZ=basic zinc (dried at 110° C.).
[2] KBZ=calcined basic zinc (calcined at 250° C.).
A is composition of Example I.
B is composition of Example II.
C is composition of Example III.
D is composition of Example IV.

In both the pigments of Example III and IV, the temperature of 250° was sufficient to drive off most of the combined water. Similar samples of basic zinc chloride pigment was heated from 110° to 400° C. At constant weight at 180° C., 250° C. and 300° C., the basicity was constant. However, between 300° and 400° C., the zinc chloride began to vaporize, and the residue became yellow, as zinc oxide would do at this temperature. When basic zinc sulfate was heated in stages 110° to 400° C., the basicity also remained constant. However, in the case of the zinc chloride, when heated above 180° C., there is a conversion of the zinc hydroxide to the zinc oxide. Likewise, in the case of zinc sulfate, a like conversion takes place between 180° and 250° C.

Even though the basicity remained apparently constant while calcining at the higher temperatures, a noted conversion does in fact take place. Above the temperatures noted above, for the chloride and sulfate, part of the zinc hydroxide is converted to zinc oxide.

The phenomenon of apparent conversion of the zinc hydroxide to the zinc oxide also takes place when the basicity, expressed as the molar ratio of ZnO:ZnA, of the basic zinc composition achieves the ratio of 9:1 for the chloride and sulfate salts and 13:1 for the nitrate salt. This ratio is referred to as the "critical basicity" for these basic zinc compositions. The average "critical basicity" for all of the basic zinc compositions within the purview of the present invention is about 11:1. Above this "critical basicity" the apparent conversion takes place and the resultant product deviates from the basic zinc pigments of this invention.

The critical basicity of the chloride, sulfate and nitrate can be seen from the following table:

*Table II*

Critical Basicity

| Sample | Precipitation Mol Ratio NaOH:Zinc salt | Analysis of Dried Product | | | Calculated Mol Ratio | | | Basicity,[1] ZnO:ZnA |
|---|---|---|---|---|---|---|---|---|
| | | Percent Zn | Percent Anion | Percent $H_2O$ | ZnA | ZnO | $H_2O$ | |
| $ZnCl_2$: | | | | | | | | |
| A | 1.0:1 | 67.7 | 13.3 | 5.3 | 0.22 | 1 | 0.36 | 4.5:1 |
| B | 1.5:1 | 68.2 | 13.2 | 4.9 | 0.22 | 1 | 0.32 | 4.6:1 |
| C | 1.7:1 | 71.4 | 7.4 | 5.3 | 0.11 | 1 | 0.30 | 9.4:1 |
| D | 1.8:1 | 75.2 | 3.8 | 3.5 | 0.049 | 1 | 0.18 | 20.6:1 |
| E | 1.9:1 | 76.8 | 1.0 | 3.7 | 0.012 | 1 | 0.18 | 82:1 |
| F | 2.0:1 | 77.9 | 0.1 | 2.9 | 0.001 | 1 | 0.14 | 703:1 |
| $ZnSO_4$: | | | | | | | | |
| A | 1.0:1 | 56.5 | 21.1 | 12.1 | 0.34 | 1 | 1.04 | 2.9:1 |
| B | 1.5:1 | 55.4 | 17.8 | 16.3 | 0.28 | 1 | 1.36 | 3.6:1 |
| C | 1.7:1 | 65.2 | 9.6 | 10.9 | 0.11 | 1 | 0.67 | 9.0:1 |
| D | 1.8:1 | 71.9 | 4.3 | 6.9 | 0.042 | 1 | 0.37 | 23.6:1 |
| E | 1.9:1 | 77.0 | 0.2 | 4.1 | 0.001 | 1 | 0.19 | 754:1 |
| F | 2.0:1 | 77.3 | 0.0 | 3.8 | 0.00 | 1 | 0.18 | ---- |
| $Zn(NO_3)_2$: | | | | | | | | |
| A | 1.0:1 | 61.7 | 18.4 | 7.1 | 0.19 | 1 | 0.50 | 5.3:1 |
| B | 1.5:1 | 57.2 | 19.5 | 11.9 | 0.22 | 1 | 0.92 | 4.6:1 |
| C | 1.7:1 | 70.9 | 9.0 | 9.3 | 0.077 | 1 | 0.54 | 13.0:1 |
| D | 1.8:1 | 74.5 | 3.2 | 4.6 | 0.123 | 1 | 0.23 | 43.8:1 |
| E | 1.9:1 | 78.3 | 1.1 | 1.6 | 0.007 | 1 | 0.80 | 140:1 |
| F | 2.0:1 | 75.9 | 0.0 | 5.6 | 0.00 | 1 | 0.27 | ---- |

[1] Basicity: In order to show the relation of water to the zinc oxide more clearly, the ratios are expressed as molar fractions of the zinc oxide.

It can readily be seen from this table that the critical basicity is reached in sample C and surpassed in sample D in all cases. Above this point, with a slight addition of the NaOH, there is a marked jump in final basicity of the composition, as indicated in the final column.

When dispersed in water, the pigments of Examples

I through IV develop pH's as shown in the following table:

| Example | | Concentration in water | | | |
|---|---|---|---|---|---|
| | | 1% | 2.5% | 5% | 10% |
| I | Basic zinc sulfate, 3:1 | 7.21 | 6.85 | 6.75 | 6.50 |
| II | Basic zinc chloride, 4:1 | 7.29 | 7.01 | 6.96 | 6.74 |
| III | Calcined basic zinc sulfate, 3:1 | 6.53 | 6.38 | 6.28 | 6.13 |
| IV | Calcined basic zinc chloride, 4:1 | 7.05 | 6.62 | 6.26 | 6.16 |

These pigments contain a large acidic reserve, in spite of their nearly neutral pH, which is especially useful in some of the synthetics, such as silicones, urethanes, and fluorinated compositions.

For many purposes, such as urethane paint finishes, a small amount of water is necessary to harden the film. This water can be obtained by the reaction of carbon dioxide from the atmosphere with the basic zinc pigment, or by the slow reaction of acids in the film with the zinc hydroxide. One method of providing such an acid, is the addition of an aldehyde group, in the paint film, which oxidizes to form an acid. The acid then reacts with zinc hydroxide to form water.

EXAMPLE V 190.5 grams $Zn(NO_3)_2 \cdot 6H_2O$ (0.5 mol, 99% C.P. were dissolved in distilled water to make one liter. 21.0 grams sodium hydroxide (0.5 mol, 97% tech. flakes) were dissolved in water to make one liter. The two solutions were added together through the eye of a turbine mixer, to produce a white viscous slurry with a pH of 5.5 to 6.0. The slurry was filtered on an eleven centimeter Büchner funnel, filtering rapidly with a clear filtrate with a pH of 5.5–6.0, this filtrate contained considerable zinc in solution when tested with $K_4Fe(CN)_6$.

The filter cake was washed with ten 200 cc. portions of distilled water, placed in a tray, and dried in a circulating air oven at 110° C. to constant weight. The yield was 32.6 grams of soft, fluffy, white pigment. The pigment analyzed 58.7% zinc and 20.1% nitrate, which indicates a formula of approximately $$4.5Zn(OH)_2 \cdot Zn(NO_3)_2$$

EXAMPLE VI 25.8 grams of Arquad 2C (di-coco dimethyl ammonium chloride, Armour Chemical Co.), were slurried in 500 cc. of water. 195 grams of acicular zinc oxide were mixed in the Arquad slurry, for half an hour. Thereafter, 85.8 grams of zinc chloride, dissolved in 200 cc. of water, were added. The slurry immediately thickened. After one hour, the slurry was heated to 86° C. for half an hour. The basic zinc chloride precipitated, was filtered, and washed with 100 cc. of water. The filter cake was dried at 110° C. for four hours, and then at 170° C. for half an hour. 277 grams of basic zinc chloride was recovered. The pigment was soft and white. The acicular shape of the zinc oxide was largely maintained. The basicity was calculated to be 4:1.

This pigment, when mixed with paint, in an amount equal to the amount of zinc oxide pigment normally used, mildly thickened the paint. The resistance of such paint, made with the basic zinc pigment, to chalking, cracking, and checking, and also to mildew, was superior to the best commercial paint containing zinc oxide.

It has been found that the presence of the quaternary, in itself, is not an important factor in combatting mildew. The particle shape and size of the basic zinc pigment largely determined the mildew resistance of that pigment in paint.

EXAMPLE VII 9.7 grams of Arquad 2C were stirred into 250 cc. of water for five minutes. Then 97.5 grams of acicular zinc oxide were added to the dispersion. After stirring for fifteen minutes, a solution of 40.9 grams of zinc chloride in 100 cc. of water was quickly added, and the slurry was stirred for one hour. It was then heated to 90° C. for half an hour, permitted to cool to 50° C., and held at 50° C. for two hours. The pigment was then filtered quickly and washed. The filter cake was dried at 70° C. The acicular shape of the zinc oxide was maintained. The pigment was soft and white, and analyzed 62% zinc and 6.9% chlorine, giving a calculated formula of approximately $8.8 Zn(OH)_2 \cdot ZnCl_2$.

EXAMPLE VIII 22.7 grams of Arquad 2C were stirred into 550 cc. of water for ten minutes, when 180 grams of acicular zinc oxide were added. After stirring for thirty minutes, a solution of 132 grams of zinc sulfate in 200 cc. of water were added, and the slurry was stirred for thirty minutes then heated and stirred at 80–90° C. for thirty minutes. After standing overnight at room temperature (approximately sixteen hours) the slurry was filtered, and the filter cake was washed. The washed cake was dried two hours at 70° C., then three hours at 110° C. The initial acicular particles had converted entirely to tiny, thin hexagonal plates. The basicity was approximately 3.4:1.

It has been found that the needle shape is more stable at higher basicities, and the thin, flat, hexagonal plates at lower basicities. Acicular particles, thin flat hexagonal plates, and "rounds" may be formed both with sulfates and chlorides, depending upon their method of preparation.

EXAMPLE IX

A basic zinc sulfate pigment was prepared in the same manner as the basic zinc sulfate pigment of Example VIII, except that a 1% solution of Ethofat (a polyethoxyalated fatty acid, non-ionic surfactant sold by Armour Chemical Co. as 142/2D) was used instead of Arquad 2C. The resultant basic zinc sulfate (basicity 3.7:1) was a soft white powder of thin, small, hexagonal plates, somewhat aggregated.

EXAMPLE X 35.2 grams of benzene sulfonic acid were dissolved in 150 cc. water. 8.2 grams of non-acicular zinc oxide ("rounds") were dissolved in the benzene sulfonic acid solution, to make a clear solution. The solution, with a pH of 4.5–5.0 was diluted to 300 cc. A solution of 20 cc. of normal sodium hydroxide was added slowly, at 30 to 40° C., raising the pH to 6–6.5, and forming a silky precipitate. An additional 10 cc. of sodium hydroxide raised the pH to 6.5–7. The slurry was filtered, and the cake washed and dried. The product was a soft, white powder, consisting of small, very thin plates. The powder analyzed 40% zinc, and gave a calculated formula of approximately $4Zn(OH)_2 \cdot Zn(C_6H_5SO_3)_2$.

This material, with its organic character, was compatible, without surface treatment, with vehicles with which untreated basic zinc chloride, basic zinc sulfate, and basic zinc nitrate, were not.

EXAMPLE XI

A solution of dodecyl benzene sulfonic acid was neutralized to a pH of 7 with non-acicular zinc oxide, to produce a basic zinc pigment. The particles were "rounds" rather than plates, as contrasted with Example X. The basic zinc pigment showed a basicity of 4:1. The molecular weight for this compound, $$4Zn(OH)_2 \cdot Zn(C_{12}H_{25}C_6H_4SO_3)_2$$

is 1113, calculating to only 29.4% zinc.

EXAMPLE XII 192.5 grams of zinc chloride (94% tech., 181 grams real) were dissolved in sufficient water to make two liters. 5 cc. of concentrated hydrochloric acid were added to clear the solution, giving a pH of 4.5–5.0. 90.1 grams sodium hydroxide (97% tech, flakes, 87.4 grams real) were dissolved in sufficient water to make two liters. The two solutions were reacted by introducing them into the eye of a turbine mixer, to produce a white slurry with a pH of 6.2–6.4. The precipitate was filtered and washed. The filter cake was dried at 110° C. to constant weight. 127.9 grams of pigment were produced, analyzing 62.39% zinc and 12.02% chlorine, which gives a calculated formula of approximately 4.6

$$Zn(OH)_2 \cdot ZnCl_2$$

EXAMPLE XIII 192.5 grams of zinc chloride (94% tech., 181 grams real) were dissolved in sufficient water to make two liters. 5 cc. of concentrated hydrochloric acid were added to clear the solution. The pH of the solution was 4.5–5.0.

101.2 grams sodium hydroxide (97% tech. flakes, 98.2 grams real) were dissolved in sufficient water to make two liters. The two solutions were combined in the eye of a turbine mixer, to produce a white slurry, with a pH of 6.5. The precipitate was filtered and washed. The filter cake was dried at 110° C. to constant weight, yielding 131.4 grams of pigment. The pigment analyzed 62.68% zinc and 9.75% chlorine, giving a calculated formula of 5.98 $Zn(OH)_2 \cdot ZnCl_2$.

An experimental white house paint was prepared as follows:

| | |
|---|---|
| Vehicle (linseed oil base)_____percent by weight__ | 87.3 |
| Thinner (mineral spirits)_____do____ | 12.7 |
| | 100.0 |

Pigment composition:

| | |
|---|---|
| Extended titanium dioxide_____percent__ 30% $TiO_2$ 70% $CaSO_4$ | 42 |
| Pure rutile titanium dioxide_____do____ | 37 |
| Zinc oxide_____do____ | 21 |
| | 100.0 |

Paint composition:

| | |
|---|---|
| Vehicle _____percent by weight__ | 39.7 |
| Pigment _____do_____ | 60.3 |

The amount of pigment was sufficient to give 69% by weight of pigment in the dry film, or 33.5% by volume of pigment in the dry film. When ground together, in a ball mill, the resultant paint was the same as a high grade commercial house paint.

Ten gallons of paint were prepared with the formulation just given, but with the zinc oxide omitted. More than 25 one quart cans of paint were made up, by adding the basic zinc pigments to the base paint, at the rate of 14.5 parts by weight of basic zinc pigment to 100 parts by weight of the base paint.

The paints made up of the basic zinc pigments, had a slightly greater consistency than the paint made with the zinc oxide, when the basic zinc pigments were in the form of flat plates, or where the acicularity of the basic zinc pigment was greater than that of the zinc oxide. Where the consistency of the paint was increased, up to 4% of mineral spirits were added, to bring the consistency to that of the commercial paint. Samples of these paints were brushed on wood panels and exposed to weather at Columbus, Ohio, at Miami, Florida, and in a weatherometer.

The unused paints, stored in cans, were all stable and showed no hard settling or other observable changes after over two years' storage. Even in a sample in which three times the normal amount of basic zinc pigment was added, there was no hard settling. This latter sample was made up of fine basic zinc sulfate, and required about 6.5% of thinner. This paint brushed more poorly than the other formulation and showed brush marks, but otherwise formed an acceptable paint.

The basic zinc pigments in the samples, were compositions of zinc sulfate, chloride, nitrate, and the other zinc salts of the examples which form basic zinc compositions. Various of the pigments were coated with cationic, non-ionic and anionic materials, and it was evident that large quantities of these surfactants can be added. The pigments had a large range of basicities, and their particle shapes ranged from "rounds," to very thin flat hexagonal plates, and to acicular particles. As has been indicated heretofore, all of the basic zinc pigments produced good paints.

In order to obtain superior mildew resistance, it was found that the pigments should have a small particle size, preferably below 5 microns.

Fine size can be obtained by reacting the solution of the water soluble zinc salt with a solution of a base, with violent agitation, as in the eye of a turbine propeller. If the solutions are introduced at opposite sides of a tank, slowly stirred, the particles will be relatively large.

When a zinc oxide pigment or a basic zinc chloride filter cake is allowed to age with an excess of zinc chloride overnight, large hexagonal crystals form. When a very fine wet basic zinc chloride is allowed to age to a limited degree, tiny, extremely thin, hexagonal plates, that are almost microscopically invisible are formed, the thickness of the plates being only a small part of a micron. Adsorbent agents can limit the crystallization to one direction, to form fine acicular patterns.

When an acicular zinc oxide is used as the base, the acicular structure may persist, and the tiny needles may be even smaller than those in the added zinc oxide. Thus, when a limited amount of acid is mixed with the zinc oxide, the particles first become smaller as zinc oxide is dissolved from the surface of the crystal, and then the zinc salt reacts with the zinc oxide and water to form the basic pigment, still in the acicular form.

As has been indicated, the finely divided basic zinc pigments of this invention may be surface treated with organic compounds, either mechanically, as by milling the pigments with the compounds, or during the formation of the pigments, as is indicated by some of the examples, in which the reaction takes place in a solution or slurry of organic materials. The organic compounds which are useful as surface treating materials, include anionic wetting agent, such as the aliphatic acids ranging from acetic and propionic to long chain acids including lauric, oleic, stearic and even longer chains, propionic and lauric acids having proved especially useful; cationic surface active agents, such as di-coco dimethyl ammonium chloride (Arquad 2C) and 1-(2-hydroxyethyl)-2-n-alkyl-1 (or 3) (4-chlorobutyl)-2-imidazolinium chloride (Nalquat G-9-12 or -11 or -13, sold by National Aluminate Corporation); or non-ionic surfactants, such as polyethoxylated fatty acid (Ethofat 142/20, sold by Armour Chemical Company). In general, the anionic surfactants have been added to the dry pigment, and the non-ionic and cationic surfactants, in the course of the precipitation of pigments. However, the mode of addition can be varied as desired.

Various other modifications will be suggested to those skilled in this art without departing from the spirit of this invention, or the scope thereof, as set forth in the appended claim.

Having thus described the invention, what is claimed and desired to be secured by Letters Patent is:

The method of producing pigment consisting essentially of hexagonal plates of a colorless basic zinc sulfate capable of acting as a substantial reservoir of acidic material, having a pH of not less than about 6, a low density and opacity as compared with zinc oxide, and having a general formula of $nZn(OH)_2 \cdot ZnSO_4$, wherein $n$ is a number between 1 and 13, comprising, co-precipitating zinc hydroxide and zinc sulfate, maintaining the precipitate wet, and aging said wet precipitate until the precipitate particles assume a flat hexagonal plate form of the desired size, and then promptly drying said precipitate.

(References on following page)

References Cited in the file of this patent

UNITED STATES PATENTS

| | | |
|---|---|---|
| 1,694,710 | Lenander | Dec. 11, 1928 |
| 2,139,995 | Breyer et al. | Dec. 13, 1938 |
| 2,180,721 | Roon et al. | Nov. 21, 1939 |
| 2,313,619 | Bruce | Mar. 9, 1943 |
| 2,348,883 | Cyr | May 16, 1944 |
| 2,356,767 | Kropa | Aug. 29, 1944 |
| 2,419,017 | Grimm | Apr. 15, 1947 |
| 2,548,048 | Olsen | Apr. 10, 1951 |
| 2,785,990 | Coulter | Mar. 19, 1957 |
| 2,844,486 | Lamar | July 22, 1958 |

FOREIGN PATENTS

| | | |
|---|---|---|
| 547,756 | Canada | Oct. 22, 1957 |

OTHER REFERENCES

Zh. Prikl. Khim., No. 12, pages 1780–1785, 1939.

Kekwick et al.: Paint Manufacture, January 1938, pages 22 and 23.

Fischer et al.: Ind. and Eng. Chem., March 1943, volume 35, No. 3, pages 336–343.

Depew: Ind. and Eng. Chem., April 1933, volume 25, No. 4, pages 370–374.

UNITED STATES PATENT OFFICE
CERTIFICATE OF CORRECTION

Patent No. 3,136,647  June 9, 1964

George R. Waitkins et al.

It is hereby certified that error appears in the above numbered patent requiring correction and that the said Letters Patent should read as corrected below.

Column 1, line 9, after "pigments", line 11, after "compositions", line 16, after "pigments", line 34, after "Rankin", and line 35, after "chlorine", each occurrence, insert a comma; column 2, line 1, for "for" read -- form --; column 2, line 3, after "provided", lines 27 and 28, after "pigment", line 31, after "pounds", line 34, after "pound", line 40, after "milled", line 45, after "pounds", line 47, after "pound", and line 53, after "I", each occurrence, insert a comma; columns 5 and 6, Table I.-Continued, under the column headed "D", line 9 thereof, for "260K" read -- 260 --; same columns 5 and 6, Table II, under the column headed "Calculated Mol Ratio ZnA", line 16 thereof, for "0.123" read -- 0.023 --; column 7, line 27, after "C.P." insert a closing parenthesis; line 32, after "white" insert a comma; column 9, line 50, for "mades" read -- made --.

Signed and sealed this 20th day of October 1964.

(SEAL)
Attest:

ERNEST W. SWIDER
Attesting Officer

EDWARD J. BRENNER
Commissioner of Patents